Patented Dec. 9, 1930

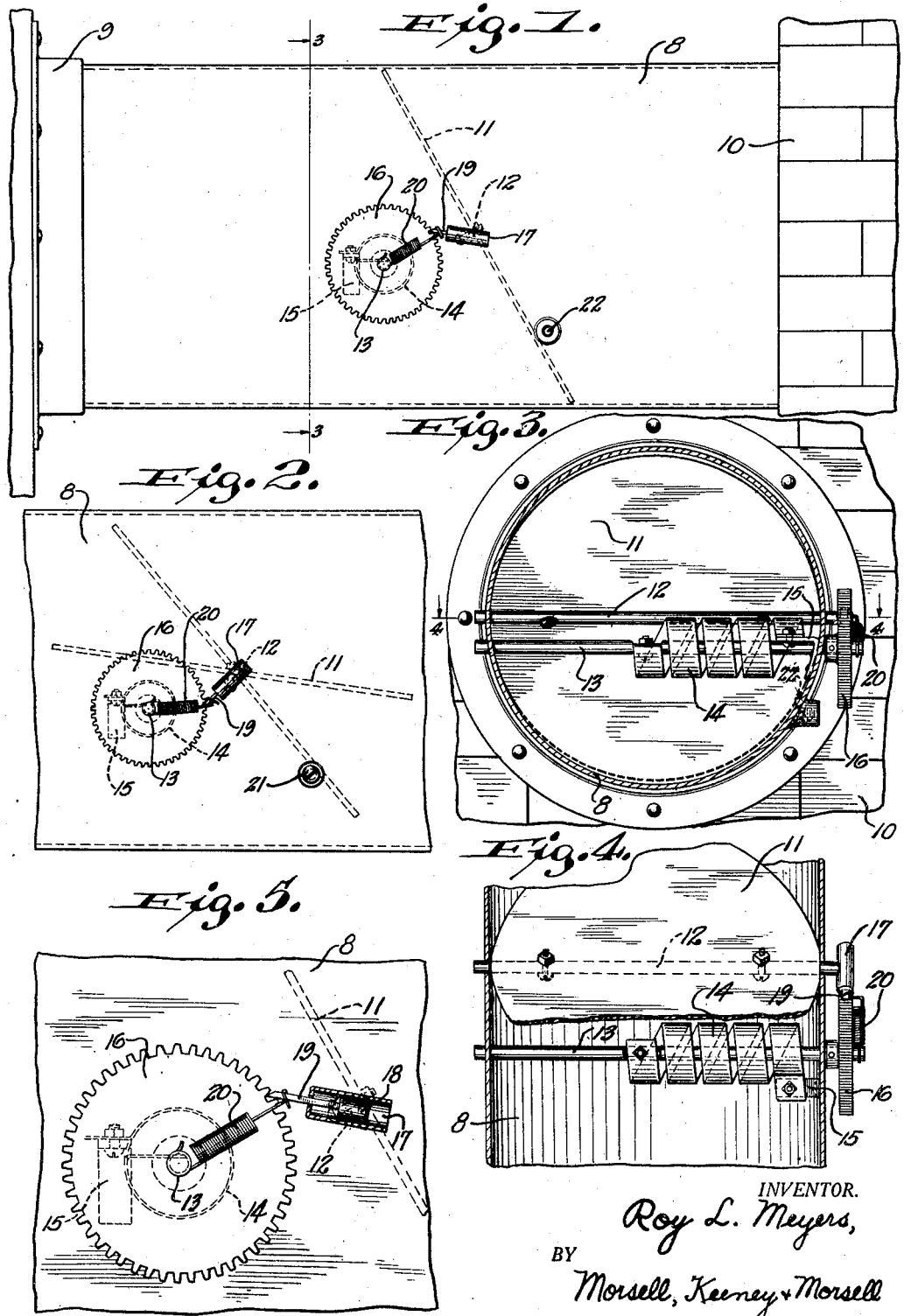

1,784,608

UNITED STATES PATENT OFFICE

ROY L. MEYERS, OF JANESVILLE, WISCONSIN

AUTOMATIC PIPE DAMPER

Application filed January 21, 1929. Serial No. 333,969.

This invention relates to improvements in automatic pipe dampers.

Smoke pipes extending from furnaces, boilers and heaters are usually equipped with dampers to control the draft through the pipe and the ordinary damper must be manually adjusted.

It is, therefore, the primary object of the present invention to provide a pipe damper which is automatic in its movements and in which the movements of the damper are effected by the expansion and contraction of a thermostatic member.

A further object of the invention is to provide an automatic pipe damper located within the heated zone of a pipe and having a contractile and expansile thermostatic operating member influenced by the temperature of fluid passing through the pipe so that if the temperature of the fluid exceeds a predetermined degree the damper will be moved to closed position, and vice versa.

A further object of the invention is to provide an automatic pipe damper which, when in closed position, may be yieldingly moved to open position by pressure thereagainst, as caused by blasts or by the explosion of gases within the heater, the damper being so hung that it will swing to closed position again after having been forced open.

A further object of the invention is to provide means in the automatic pipe damper which will prevent breakage of the thermostatic operating member due to further contraction or expansion of the same after the damper has completed its course of movement either to full open or full closed position.

A further object of the invention is to provide an automatic damper of the class described in which movements of a thermostatic spring member are transmitted to the damper through the engagement of a yielding dog with a sprocket and arranged so that if the dog should get out of mesh with the sprocket it will automatically be brought into mesh again when the associated parts are moved due to a rise or fall in the temperature of the fluid in the pipe.

A further object of the invention is to provide an automatic pipe damper with which a fluid pipe may be easily and cheaply equipped, which is strong and durable, which is efficient in operation, and which is well adapted for the purposes described.

With the above and other objects in view the invention consists of the improved automatic pipe damper, and its parts and combinations as set forth in the claims, and all equivalents thereof.

In the accompanying drawing in which the same reference characters indicate the same parts in all of the views:

Fig. 1 is a side view of a smoke pipe extended between a heater and a chimney and equipped with the improved automatic damper, the latter being indicated in its fully closed position;

Fig. 2 is a side view of a portion of a smoke pipe with the automatic damper thereon in open position, the damper also being shown in a restricted partially closed position;

Fig. 3 is a cross-sectional view taken on line 3—3 of Fig. 1;

Fig. 4 is a sectional view taken on line 4—4 of Fig. 3; and

Fig. 5 is an enlarged fragmentary side view of a smoke pipe with the damper in closed position and showing the external damper mechanism, some of the latter being in section.

Referring now more particularly to the drawing, it will appear that the numeral 8 indicates a heater smoke pipe extending between a heater 9 and a chimney 10. Within said smoke pipe is a damper or valve 11 in the form of a metallic disc substantially medially mounted on a pivot rod 12 extending transversely through the pipe 8.

An operating shaft 13 also extends pivotally through the smoke pipe transversely of the same and forwardly of and slightly below the pivot rod 12. One end portion of a thermostatic spring member 14, coiled about said shaft, is secured to a medial portion of the same. The other end portion of said spring member is secured to a lug or bracket 15 projecting inwardly from an inner side wall of the pipe 8. Said thermostatic spring member is composed of two superimposed layers of metals having different coefficients of expansion and arranged so that the application of heat thereto will cause the spring to unwind or expand, and the influence of cold will cause the spring member to wind up or contract, such movements being communicated to the operating shaft 13 to turn it in one direction or the other.

A sprocket wheel 16 is mounted fast on an end portion of the operating shaft 13, and in order to transmit turning movements of the shaft 13, caused by winding and unwinding of the thermostatic spring 14, to the pivot rod 12 and damper 11, the outer end portion of said rod carries fast, at right angles thereto, a tubular member 17. Said tubular member is shown in detail in Fig. 5, and a cylinder 18 is loosely mounted therein and has a limited slidable movement. Integral with said cylinder and extending slidably through an end portion of the member 17 is a dog 19 engaging a tooth of the sprocket wheel 16. Also, one end portion of a spring 20 is connected to said dog, while the other end portion of the spring is secured about the shaft 13.

Assuming that the damper is closed, as illustrated in Figs. 1, 3 and 5, if the heat of fluid within the pipe 8, forwardly of the damper, drops below a predetermined degree, the contraction or winding of the thermostatic spring member 14 will cause its shaft 13 and the sprocket 16 thereon to turn in a clock-wise direction in Figs. 1 and 5. As the dog 19 is engaged with a tooth of the sprocket, the dog will be turned downwardly, as in Fig. 2, turning the rod 12 and damper in a counter clock-wise direction, opening the damper. It may happen that the spring 14 will continue to contract somewhat after open position has been reached, and should this occur the spring held dog will simply slip on the sprocket and no strain will be thrown upon the thermostatic spring.

If the fluid in the pipe exceeds a predetermined temperature the thermostatic spring will expand and the action will be the reverse of that described and the damper will be swung to closed position.

In some instances it may be desirable to limit the closure of said damper and for that purpose a removable pin 21 is inserted through a lower opening 22 in the pipe 8. When this is done, the damper, on being moved toward closed position, will engage the pin and will be held thereby in a slightly open position, as in the dotted line showing in Fig. 2. If the spring 14 continues expanding somewhat, the dog will slip on the sprocket and relieve strain.

If a blast or explosion should occur within the heater when the damper is in closed position, the mounting of the damper will permit it to be forced open by the pressure thereagainst, and expel the gases to the chimney. Then, the weight of the damper below its pivotal mounting will cause it to swing to closed position again.

From the foregoing description it will be seen that the improved automatic pipe damper is of simple and novel construction, and is well adapted for the purposes described.

What I claim as my invention is:

1. The combination with a pipe, of a disc-shaped damper centrally pivotally mounted therein and inclined from vertical when in closed position, a contractile and expansile thermostatic member within the pipe, and mechanism between the thermostatic member and the damper for transmitting certain movements of the thermostatic member to the damper.

2. The combination with a pipe, of a damper movably mounted therein, a bi-metallic thermostatic spring member within the pipe adjacent the damper and contractile and expansile, and mechanism between the spring member and the damper for transmitting certain movements of the spring member to the damper to change its position within the pipe.

3. The combination with a pipe, of a damper movably mounted therein, a shaft extended revolubly through the pipe, a thermostatic spring member coiled about said shaft within the pipe and connected to the shaft, and a connection between the shaft and the damper whereby certain desired turning movements of the shaft are imparted to the damper.

4. The combination with a pipe, of a pivot rod extended transversely therethrough, an oval plate damper carried by said rod within the pipe and movable to open or close the pipe, a shaft extended transversely through the pipe, a sprocket mounted fast on said shaft, a thermostatic spring member coiled about the shaft within the pipe and connected to the shaft, a dog member carried by the pivot rod, and means for yieldingly holding said dog in engagement with the sprocket.

5. In a smoke pipe extended between a heater and a chimney, a pivot rod extended transversely through said pipe, an oval plate damper medially carried by said rod within the pipe and inclined when in closed position away from the heater end of the pipe, a shaft extended transversely through said pipe slightly forwardly of and below said pivot rod, a bi-metallic thermostatic spring member coiled about said shaft within the pipe and secured at one end portion to the pipe and at the other end portion to said shaft, a sprocket mounted fast on an end portion of said shaft externally of the pipe, a dog yieldingly secured to an end portion of said pivot rod, and a spring connected to said dog to yieldingly hold same in engagement with the sprocket.

In testimony whereof, I affix my signature.

ROY L. MEYERS.